United States Patent
Rosemarine

(10) Patent No.: US 11,656,905 B2
(45) Date of Patent: May 23, 2023

(54) DELEGATION CONTROL BASED ON PROGRAM PRIVILEGE LEVEL AND PAGE PRIVILEGE LEVEL

(71) Applicant: Arm Limited, Cambridge (GB)

(72) Inventor: Elliot Maurice Simon Rosemarine, London (GB)

(73) Assignee: Arm Limited, Cambridge (GB)

(*) Notice: Subject to any disclaimer, the term of this patent is extended or adjusted under 35 U.S.C. 154(b) by 827 days.

(21) Appl. No.: 16/536,608

(22) Filed: Aug. 9, 2019

(65) Prior Publication Data

US 2021/0042159 A1 Feb. 11, 2021

(51) Int. Cl.
  G06F 9/50    (2006.01)
  G06N 3/063   (2023.01)
  G06F 9/455   (2018.01)
  G06F 21/62   (2013.01)

(52) U.S. Cl.
  CPC ........ *G06F 9/5011* (2013.01); *G06F 9/45558* (2013.01); *G06F 21/6218* (2013.01); *G06N 3/063* (2013.01); *G06F 2009/4557* (2013.01)

(58) Field of Classification Search
  None
  See application file for complete search history.

(56) References Cited

U.S. PATENT DOCUMENTS 9,836,318 B2 * 12/2017 Brewerton .......... G06F 9/30043
10,019,380 B2 * 7/2018 GadelRab .......... G06F 12/1072
2010/0319068 A1 * 12/2010 Abbadessa .............. H04L 63/08
  726/21
2015/0242233 A1 * 8/2015 Brewerton .............. G06F 13/28
  710/308
2016/0092802 A1 * 3/2016 Theebaprakasam ........................
  G06Q 10/0631
  705/7.12

OTHER PUBLICATIONS

Geethakumari et al. "Dynamic Delegation Approach for Access Control in Grids", 2005 IEEE, 8 pages.*
Han et al. "Priority Based Transaction Scheduling Model and Concurrency Control in Grid Database", 2008 IEEE, pp. 235-241.*

* cited by examiner

*Primary Examiner* — Van H Nguyen
(74) *Attorney, Agent, or Firm* — EIP US LLP

(57) ABSTRACT

A neural processing unit comprises an input module for receiving a transaction from at least one program, each program has an associated program privilege level; and a plurality of delegation pages, each delegation page comprising a delegation management unit associated with a page privilege level. The neural processing unit also comprises at least one resource arranged to be accessed by at least one of the delegation pages; and a processing module arranged to process the transaction. Processing the transactions comprises allocating each transaction to a delegation page based on the program privilege level and page privilege level. The program is arranged to instruct the delegation management unit of a first delegation page, having a first-page privilege level to delegate access to the at least one resource to a second delegation page having a second-page privilege level, and wherein the first-page privilege level is higher than the second-page privilege level.

17 Claims, 7 Drawing Sheets

DELEGATION CONTROL BASED ON PROGRAM PRIVILEGE LEVEL AND PAGE PRIVILEGE LEVEL

BACKGROUND OF THE INVENTION

Field of the Invention

The present invention relates to a neural processing unit, system and method for delegating access to one or more resources.

Description of the Related Technology

Delegating access to one or more resources enables multiple programs to access resources of a neural processing unit based on their requirements. Each program has a privilege level which determines the level of access a program has, and as such, the resources it has access to. Ensuring all programs potentially have access to all resources results in a duplication of hardware for programs of each privilege level, for example, a neural processing unit having a direct interface for each program may be provided. Access to the resources is then managed and determined based on the programs requesting it.

SUMMARY

According to a first aspect of the present invention, there is provided a neural processing unit, comprising an input module for receiving a transaction from at least one program, each program having an associated program privilege level; a plurality of delegation pages, each delegation page comprising a delegation management unit; and being associated with a page privilege level; at least one resource arranged to be accessed by at least one of the delegation pages; and a processing module arranged to process the transaction, wherein processing the transactions comprises allocating each transaction to a delegation page based on the program privilege level and page privilege level; wherein the program is arranged to instruct the delegation management unit of a first delegation page, having a first-page privilege level to delegate access to the at least one resource to a second delegation page having a second-page privilege level, and wherein the first-page privilege level is higher than the second-page privilege level.

According to a second aspect of the present invention, there is provided a method of processing transactions, the method comprising the steps of receiving a transaction from at least one program, each program having an associated program privilege level; allocating the transaction to one of a plurality of delegation pages, each delegation page having a page privilege level and comprising a delegation management unit, wherein assigning the transaction is based on the page privilege level and the program privilege level; and processing the transaction at the delegation page, wherein processing the transaction comprises accessing at least one of a plurality of resources; wherein the program is arranged to instruct the delegation management unit of a first delegation page, having a first-page privilege level to delegate access to at least one resource to a second delegation page having a second-page privilege level, and wherein the first-page privilege level is higher than the second-page privilege level.

According to a third aspect of the present invention, there is provided a non-transitory computer readable storage medium comprising a set of computer-readable instructions stored thereon which, when executed by at least one processor, cause the at least one processor to receive a transaction from at least one program, each program having an associated program privilege level; allocated the transaction to one of a plurality of delegation pages, each delegation page having a page privilege level and comprising a delegation management unit, wherein assigning the transaction is based on the page privilege level and the program privilege level; and process the transaction at the delegation page, wherein processing the transaction comprises accessing at least one of a plurality of resources; wherein the program is arranged to instruct the delegation management unit of a first delegation page, having a first-page privilege level to delegate access to at least one resource to a second delegation page having a second-page privilege level, and wherein the first-page privilege level is higher than the second-page privilege level.

BRIEF DESCRIPTION OF THE DRAWINGS

Further features and advantages of the invention will become apparent from the following description of preferred embodiments of the invention, given by way of example only, which is made with reference to the accompanying drawings in which like reference numerals are used to denote like features.

DETAILED DESCRIPTION OF CERTAIN INVENTIVE EMBODIMENTS

Figure 1:
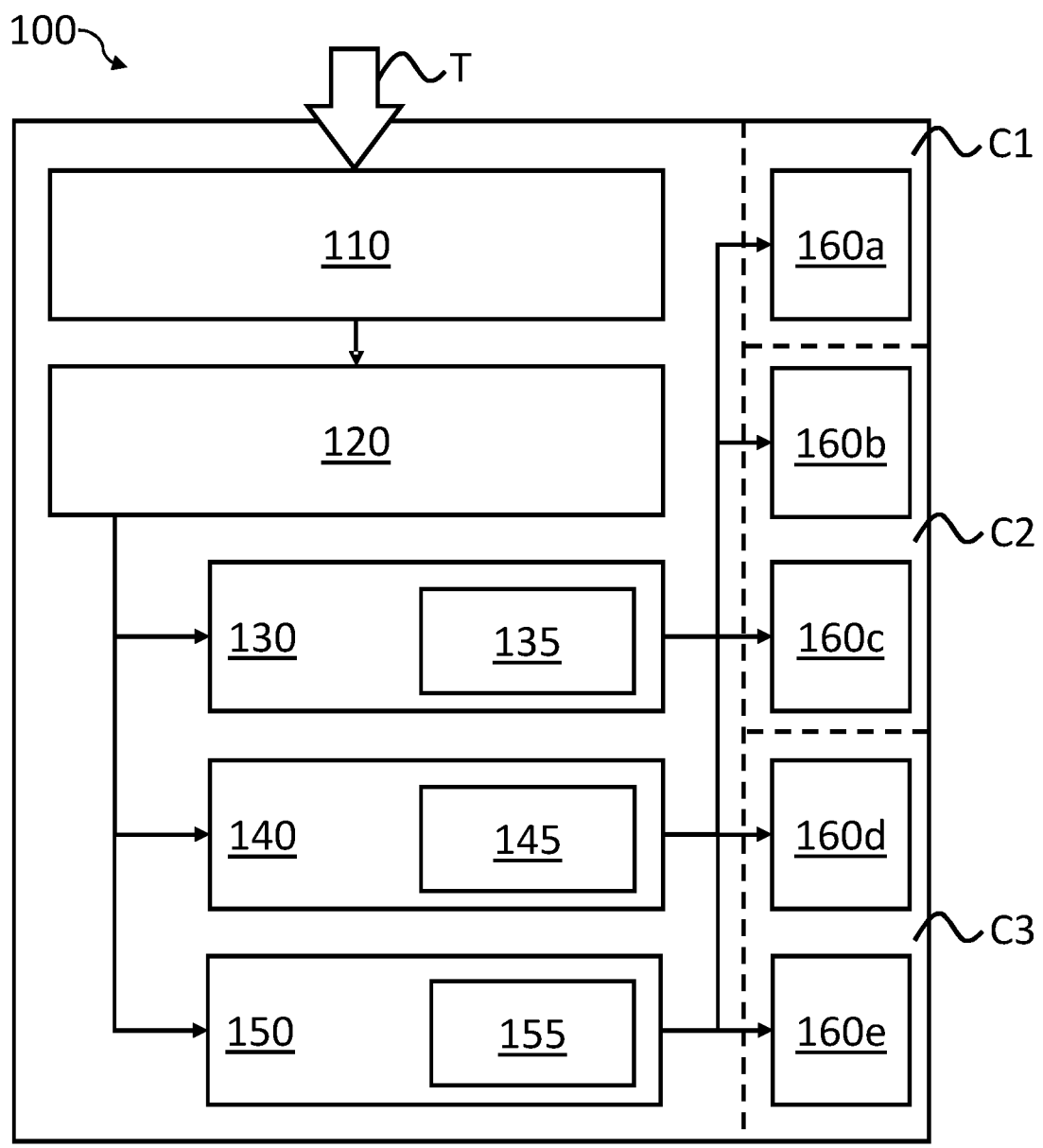
FIG. 1 shows schematically, a neural processing unit according to examples.

Details of processors, systems, and methods according to examples will become apparent from the following description with reference to the Figures. In this description for the purposes of explanation, numerous specific details of certain examples are set forth. References in the specification to 'an example' or similar language mean that a feature, structure, or characteristic described in connection with the example is included in at least that one example but not necessarily in other examples. It should be further noted that certain examples are described schematically with certain feature omitted and/or necessarily simplified for the ease of explanation and understanding of the concepts underlying the examples.

When multiple host agents/programs/threads want to run a transaction, such as identifying objects, or other tasks on a neural processing unit ('NPU') commonly, a direct hardware interface for each program is provided. This enables each program to request access to the NPUs resources for performing the tasks/executing instructions—for example, executing/training a neural network. However, this increases the amount of, and complexity of, the hardware involved. As such, in one example of the invention, when multiple programs want to run tasks on the NPU, rather than provide a direct hardware interface for each program, one option is to enable a program with a higher privilege level to arbitrate access to resources, such as registers. For example, if two programs/threads running on an operating system want to perform tasks on the NPU, it is expected that the operating system would be responsible for managing the program/thread's access to the resources and interacting with the NPU. Similarly, if two programs/threads are running on two different operating systems, a hypervisor, would be responsible for managing the operating system's access to the resources and interacting with the NPU, each operating system would then be responsible for managing the program/thread's access to the resources. While such schemes exist already, they can be slow and cumbersome when dealing with multiple programs/threads. This invention provides a mechanism to accelerate the latter scheme with less hardware and complexity than the former scheme.

Over time, the programs that want to run tasks on the NPU will change. If only a single virtualized operating system, such as an operating system running on a hypervisor, wants to run tasks, then the hypervisor would delegate some aspects of the NPU management to the operating system, whilst restricting or limiting access to particular resources, such as registers. This ensures that higher privilege level programs can still maintain access and control over particular resources, whilst providing access to other resources to lower privilege level programs, such as an operating system running under a hypervisor, may have the ability to schedule tasks, by having the resource responsible for scheduling tasks delegated to the delegation page the operating system is assigned to. A delegation page is representative of a collection resources and controls, and a delegation unit responsible for delegating access to one or more of the resources. Conversely, if there are two virtualized operating systems running under the hypervisor, access to different resources, or limiting the access to particular resources may be implemented. For example, the hypervisor may maintain control over the ability to schedule tasks to run for the operating systems.

Similarly, where there is only a single application running on a single operating system, particular resources may be delegated to the application. However, where there are multiple applications running on a single operating system, the operating system may maintain control over particular resources, such as the ability to schedule tasks from different applications on the NPU.

Delegating the access to particular resources in such a way enables different delegation schemes to be used depending on the programs requesting access to the resources and their relative privilege levels. This provides acceleration mechanisms, as well as a level of dynamism in enabling programs to access the resources. In some examples, this dynamism also enables a variety of static delegation models to be implemented.

The NPU comprises a plurality of resources, such as memory or register, may be in the form of a control register, each assigned a particular category, including system control, execution control, and debug. Initially, the execution control page and the debug page are not accessible from a host system. The execution control page contains the registers to control the execution of a neural network. The system control pages are intended for access externally from the host, forms part of the delegation control scheme. For example, the system control page may comprise resources to control communication with the host system, master streams, security controls and delegation controls. The NPU determines a privilege level of an incoming transaction based on the address of the transaction, such as which of the system control pages is being accessed. For transactions from the host, the delegation control scheme relies on a system memory management unit ('SMMU') or memory protection unit external to the NPU, such as the memory management unit built in to a processor to restrict access to the different pages based on the privilege level. In some examples, a memory protection unit may be used to implement address restriction.

FIG. 1 shows, schematically, an NPU 100 according to an example. The NPU comprises an input module 110 for receiving a transaction T from at least one program (not shown). The at least one program may be a program or thread, and may include any of a hypervisor, an operating system, or an application. It will be appreciated that the program may be of another type. Each program has an associated program privilege level. The privilege levels define a hierarchy of programs, for example, a hypervisor may have the highest privilege level, followed by an operating system running on the hypervisor, and then an application running on the operating system may have the lowest privilege level. Programs of the same type have the same privilege level, for example where there are two or more applications running on an operating system, those applications may have the same program privilege level.

The input module 110 may be communicably coupled to a system bus (not shown) of a system, such as the system 400 described below in relation to FIG. 4. As such, the programs may be arranged to be executed by one or more processors external to the NPU 100, such as a central processing unit ('CPU'), image signal processor ('ISP'), and graphics processing unit ('GPU'). The NPU 100, therefore, manages access to its resources when such a program requests the use of them.

The NPU 100 also comprises a processing module 120 arranged to receive the transaction T from the input module 110. The processing module 120 is arranged to process the transaction, for example execute a neural network, as well as manage the delegation of resources.

The processing module 120 is arranged to allocate tasks to one or more delegation pages 130, 140, 150. The delegation pages 130, 140, 150 have associated page privilege levels which correspond to the program privilege levels of the programs sending the one or more transactions T. For example, a first delegation page 130 may have a high page privilege level, a second delegation page 140 may have a medium page privilege level, and a third delegation page 150 may have a low page privilege level. It will be appreciated that other methods of categorizing the privilege level of the delegation pages 130, 140, 150 may be used, such as by associating each delegation page with a number indicating the page privilege level.

Each delegation page 130, 140, 150 is arranged to access to one or more resources 160*a*-160*e*, such as a registers, or a part of a register, based on the page and program privilege levels.

The resources 160*a*-160*e* may be arranged in categories C1, C2, C3 based on function. For example, a first category C1 may be associated with system control registers, a second category C2 may be associated with execution control registers, and a third category C3 may be associated with debug registers. In yet another example, each of the categories C1, C2, C3 may be associated with a subset of the system control registers, execution control registers, or debug registers. Each of the resources 160*a*-160*e* are communicably coupled to each of the delegation pages 130, 140, 150. Control over which of the delegation pages 130, 140,

150 and their associated transactions T are capable of accessing each resource 160a-160e is determined by the delegation management units 135, 145, 155. This will be described in further detail below.

Each delegation page 130, 140, 150 has an associated delegation management unit 135, 145, 155 which are arranged to delegate access to one or more resources 160a-160e to one or more delegation pages 130, 140, 150 based on the page and program privilege levels. That is that in some examples, the delegation management units 135, 145, 155 are arranged to delegate access to one or more delegation resources in a hierarchical cascaded manner. Furthermore, in some examples, the lowest level delegation page 150 may not comprise a delegation management unit 155 as there is no lower level delegation page for the delegation management unit 155 to delegate access to.

Figure 2:
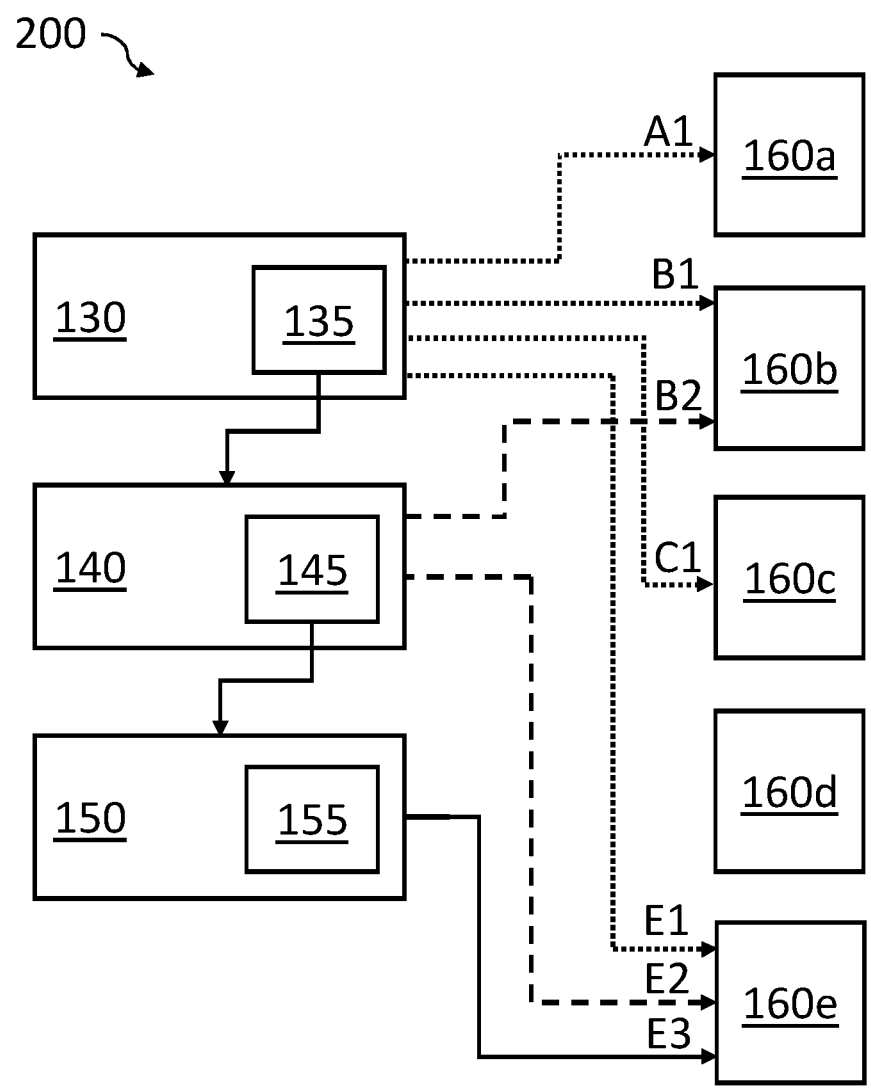
FIG. 2 shows schematically, the delegation of control to a plurality of registers according to a first example.

FIG. 2 shows schematically, an example 200 of the delegation of access to a plurality of resources 160a-160e for transactions received from a plurality of programs when the NPU supports a system with a single security state. The NPU, such as the NPU 100 described above in relation to FIG. 1 comprises the delegation pages 130, 140, 150 each with an associated page privilege level, corresponding to the program privilege level of at least one program. For example, the delegation page 130 may have the highest page privilege level, the delegation page 140 may have a middle page privilege level, and the delegation page 150 may have the lowest page privilege level. As mentioned above, there may be more or less than three page privilege levels, each being indicated by a numerical value, such as the highest page privilege level having a value of 1 and the lowest program privilege level having a value of 3, however it will be appreciated that other methods of indicating a page privilege level may be used.

Each delegation page 130, 140, 150 has a delegation management unit 135, 145, 155 capable of delegating access to one or more resources for transactions assigned to a particular page. Each delegation management unit 135, 145, 155 may delegate access to one or more resources for which it has access to, and in some examples, may be arranged to check whether a resource required by a task, has been delegated to the delegation page 130, 140, 150. As shown in example 200 of FIG. 2, the delegation access unit 135 of a first, high priority delegation page 130 may have access to registers 160a, 160b, 160c, and 160e as indicated by the dotted arrows A1, B1, C1, and E1. The first delegation page 130 has the highest page priority level and is arranged to receive transactions from a program with a corresponding program priority level. For example, the first delegation page 130 may be arranged to receive transactions from a hypervisor which also has a corresponding program priority level.

The delegation management unit 135 of the first delegation page 130 may delegate access to one or more resources to a lower page. For example, as shown in example 200 of FIG. 2, the delegation management unit 135 of the first delegation page 130 may enable lower priority programs to access registers 160b and 160e as indicated by the dashed arrows B2 and E2. In such an example, an operating system having a lower program priority level, and running on the hypervisor may request access to one or more of the resources delegated by the delegation management unit 135 of the first delegation page 130 to the second delegation page 140. The resources delegated by the delegation management unit 135 of the first delegation page 130 may comprise the ability to undertake particular operations, such as scheduling tasks on the NPU.

As with the first delegation page 130, the delegation management unit, 145 of the second delegation page 140 may also delegate access of one or more resources to a lower page. As shown in example 200 of FIG. 2, the delegation management unit 145 of the second delegation page 140 may delegate access to register 160e to the third delegation page 150. Transactions allocated to the third delegation page 150, such as those from an application running on an operating system assigned to the second delegation page 140 may then access the resources delegated, such as register 160e.

In some examples, higher page priority level delegation pages may revoke access to one or more resources. For example, if there was a first operating system with a program privilege level and assigned to the second delegation page 140, running under a hypervisor, assigned to the first delegation page 130, access to particular resources may be delegated to the first operating system. Then, if at a later point, a second operating system with the same program privilege level and also assigned to the second delegation page 140, is operating under the hypervisor, then the hypervisor may revoke access to one or more of the particular resources previously delegated to the first operating system, such as the ability to schedule tasks. In such an example, the delegation management unit 135 of the first delegation page 130, being the delegation page the hypervisor is assigned to, may revoke the access to that particular resource. For example, resource 160b may relate to the ability to schedule tasks between programs wishing to use the NPU. As described above, this resource 160b has been previously delegated to the second delegation page 140 by the delegation management unit 135 of the first delegation page 130, as such the delegation management unit 135 may revoke the access to the resource 160b such that only programs assigned to the first delegation page 130 may access it. This is particularly useful in the example of scheduling tasks as it enables a program having a higher program privilege level to manage and oversee the allocation and scheduling of tasks for multiple lower program privilege level programs. In yet a further example, if the resource 160b was also delegated by the delegation management unit 145 of the second delegation page 140 to the third delegation page 150, and access to this resource 160b was then revoked by the delegation management unit 135 of the first delegation page 130, then the delegation management unit 145 of the second delegation page 150 would revoke access to the resource 160b, which would then be revoked by the delegation management unit 135 of the first delegation page 140.

Implementing the control of access to the resources 160a-160e using this method enables efficient monitoring, allocation and revocation of resources to programs based on their privilege level, removing the need for a direct interface with each program, which requires a large amount of additional hardware, thereby reducing the complexity and cost. Furthermore, direct interfaces are inefficient when dealing with a large number of programs, as each program requires a direct interface. In such examples where the number of program interacting with the NPU exceeds the number of interfaces available, additional controls, such as software arbitration, are required, which negates the benefits of having a direct interface and introduces further inefficiencies.

Figure 3:
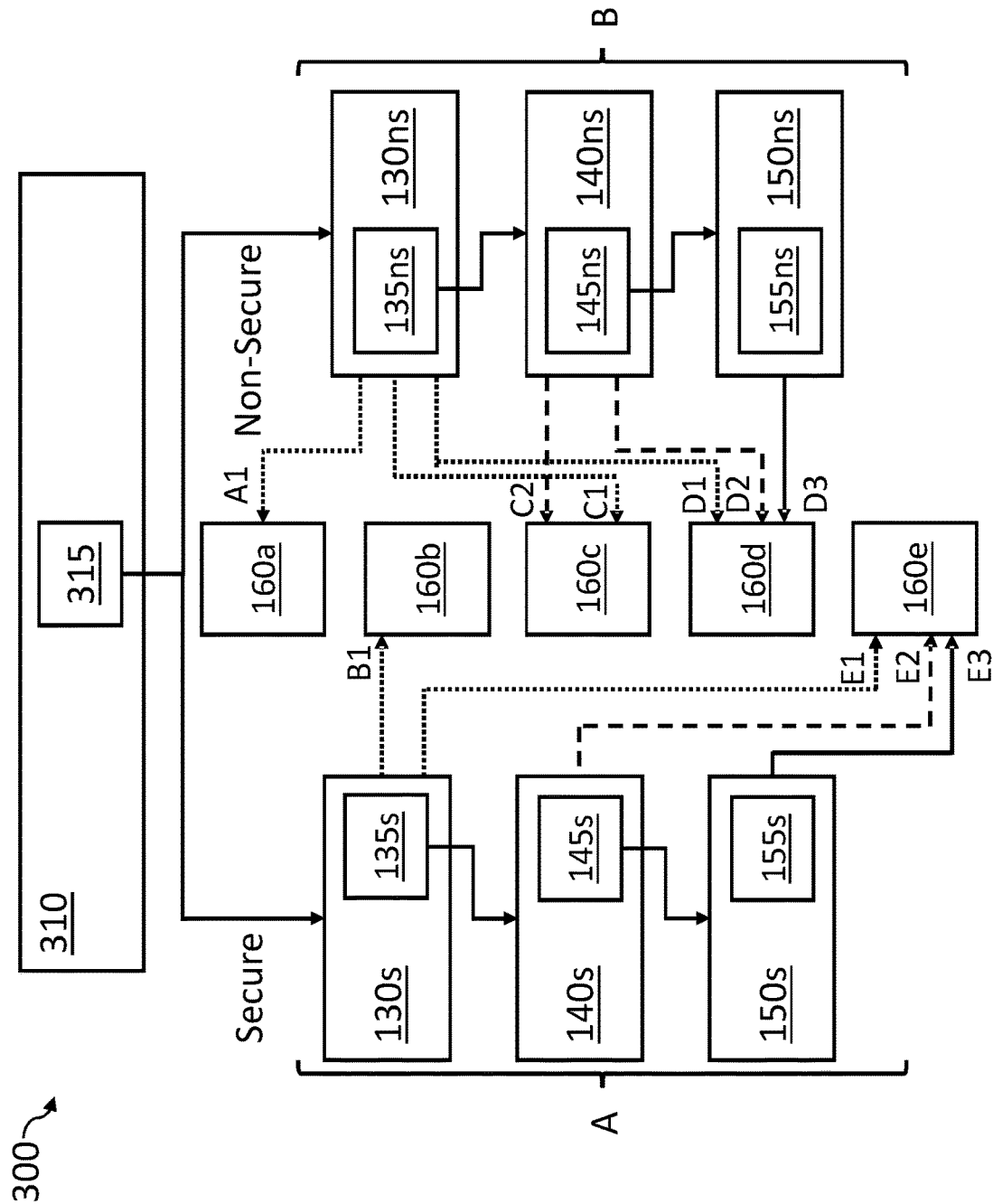
FIG. 3 shows schematically, the delegation of control to a plurality of registers according to a second example.

FIG. 3 shows schematically, an example 300 of the delegation of access to a plurality of registers 160a-160e for transactions received from a plurality of programs when the NPU supports a system with two security states. It will be appreciated that example 300 may be adapted for NPUs which have more than two security states, for example, an NPU with high, medium and low-security states.

In such an example, the NPU comprises a further delegation page, herein referred to as a security module 310, configured for determining whether a program can access the resources in a secure or non-secure manner. The security module 310, as with other delegation pages comprises a delegation management unit, herein referred to as a security delegation management unit 315, responsible for delegating access to the resources in either a secure or non-secure manner, as indicated by the 'Secure' and 'Non-Secure' solid arrows in FIG. 3.

The security module 310 and the security delegation management unit 315 are responsible for delegating access in either a secure manner to a secure set of delegation pages A, comprising delegation pages 130s, 140s, 150s, or in a non-secure manner to a non-secure set of delegation pages B comprising delegation pages 130ns, 140ns, 150ns. The security module 310 acts as a higher page privilege level than the delegation pages 130s, 140s, 150s, 130ns, 140ns, 150ns. Transactions received from a program (not shown) are first passed to the security module 310 to determine whether it is to securely, or non-securely access the resources. Whether the transaction is to access the resources in a secure or non-secure manner is dependent upon the transaction originating program. In some examples, the transaction may indicate whether it is to access the resources in a secure or non-secure manner, and in such an example, the security module may analyse the task and identify in which manner to access the resources.

In some examples, particular resources may only be accessed in a secure state, or some resources may be duplicated between security states, for example, general-purpose registers used for communication between a host system and firmware. In other examples, some resources to be shared between security states therefore reducing the amount of hardware required as well as the cost. This enables access to shared resources from particular security states to be controlled via secure delegation. Resources which are accessed via a non-secure connection will be unable to delegate access to a subset of resources via a secure connection, and vice versa, thereby preventing the access of resources using mixed permissions, and increasing the security of the system.

Returning to the example 300 of FIG. 3, a transaction from a program (not shown) is first passed to the security module 310, where based on one or more properties of the task, it is determined whether the transaction requires access to resources via a secure or non-secure method. The one or more properties of the task may indicate the security type, as well as the delegation level, and may be determined by an external processor as will be described in further detail below in relation to FIG. 4. If the transaction requires access to a resource that may only be accessed in the secure state, then the security module 310 will only allow the transaction access to resources 160a-160e in the secure manner, and block any other transaction accessing the resources 160a-160e in the non-secure manner. If the transaction is to be processed in a secure manner, then the security delegation management unit 315 delegates access to the resources via the secure set of delegation pages A.

In the secure delegation state, resources are accessed securely. The transaction is allocated to a secure delegation page 130s, 140s, 150s based on its originating program's program priority level. For example, if the transaction originates from a secure hypervisor, then the transaction may be allocated to the delegation page 130s with the highest page priority level. The hypervisor may have a number of programs, with a lower program priority level running on it, such as a secure operating system, which in turn may have multiple programs with an even lower program priority level running on it, such as an application.

As shown in FIG. 3, a hypervisor allocated to the highest-level secure delegation page 130s may request access to resources 160b and 160e, as indicated by dotted lines B1 and E1. In turn, the delegation management unit 135s, of the highest-level delegation page 130s may delegate access to these resources only. As such, an operating system running on the hypervisor may have a lower program priority level and as such be allocated to a lower-level secure delegation page, such as secure delegation page 140s. In some examples, the hypervisor may have multiple operating systems running on it which will have the same program priority level, and as such, all these programs may be allocated to the same secure delegation page, 140s. In such an example, it may be desirable for the hypervisor to retain control over the access to one or more of the resources 160b, 160e for specific purposes. When there are two or more lower program priority level programs running on a higher program priority level program, it may be desirable for that higher program priority level program to retain control over the scheduling of tasks on the NPU, and as such, the delegation module 135s, may determine it is not desirable to delegate control of that resource. This is shown in FIG. 3 by the delegation of access to resource 160b as shown by the arrow B1 from secure delegation page 130s. Access to resource 160b is not delegated to lower page priority level delegation pages, and access to resource 160e is delegated as indicated by arrows E2 and E3 which show access to 160e is delegated to lower priority secure delegation pages 140s and 150s.

In example 300 of FIG. 3, there is a program with a high program priority level allocated to secure delegation page 130s, such as a hypervisor. Whilst example 300 has a secure and non-secure state with the same number of delegation pages, 130s, 140s, 150s, 130ns, 140ns, 150ns, it will be appreciated that in some examples, the secure and non-secure states may be asymmetric in that they do not comprise the same number of delegation pages, or in other examples, the secure and non-secure states may comprise the same number of delegation pages by be accessing a different number of them at any one time. The program has requested access to resources 160b and 160e. One or more other programs, such as operating systems are may be running on the hypervisor. The operating systems have a lower program priority level than the hypervisor and, as such, are allocated to the medium program priority level secure delegation page 140s. The high-level program has enabled the delegation of resource 160e to lower level programs, and the delegation management unit 135s of the high page priority level secure delegation page 130s has delegated access of that resource 160e to the medium page priority level secure delegation page 140s. Similarly, one or more programs, such as applications may be running on the operating systems. These programs have a lower program priority level and are assigned to an even lower level secure delegation page, such as secure delegation page 150s. The delegation management unit 145s of the medium page priority level secure delegation page 140s delegates access to one or more resources, in this case, resource 160e as indicated by arrow E3, to the lower level secure delegation page 150s. As such, programs assigned to that secure delegation page 150s can securely access the resource 160e.

In some examples, as mentioned above in relation to example 200 of FIG. 2, a program with a higher program priority level may wish to rescind or revoke access to one or more resources 160a-160e that it has previously delegated access to. For example, a hypervisor running on secure delegation page 130s may rescind access to resource 160e for lower program priority level programs, in such a case the delegation management unit 135s of secure delegation page 130s informs the medium page priority level secure delegation page 140s that access has been withdrawn. The delegation management unit 145s of the medium page priority level secure delegation page 140s then informs the lower page priority level secure delegation page 150s that access to resource 160e has been withdrawn. Control of the resource 160e then returns to the high page priority level secure delegation page 130s, as indicated by arrow E1.

Returning to the security module 310, if the transaction indicates that it is to be processed in a non-secure manner then, the security delegation management unit 315 delegates access to the resources via the non-secure set of delegation pages B. A program with a high page priority level, such as a non-secure hypervisor, is assigned to a first of the non-secure delegation pages 130ns, 140ns, 150ns, which has a substantially similar priority level to the page priority level, such as non-secure delegation pages 130ns. The security delegation management unit may delegate access to particular resources to the non-secure set of delegation pages, for examples resource 160a, 160c, and 160d, as indicated by dotted arrows A1, C1, and D1. As such, as the non-secure delegation page, 130ns with the highest page privilege level, programs assigned to that page may access those resources and have the ability to delegate access to non-secure delegation pages with a lower page privilege level, such as non-secure delegation page 140ns and 150ns.

The non-secure hypervisor may have one or more non-secure programs running on it, such as a non-secure operating system. The non-secure operating system running on the hypervisor has a lower program privilege level than the non-secure hypervisor, and as such will access resources via the non-secure delegation page having a lower page privilege level, such as non-secure delegation page 140ns. The non-secure operating system may also wish to execute tasks on the NPU using one or more resources, as such, the delegation management unit 135ns of the hypervisor's delegation page 130ns, is arranged to delegate access to resources 160a, 160c, 160d, to the lower-level non-secure delegation page 140ns as required. For example, the non-secure hypervisor may determine that the non-secure operating system can have access to resources 160c and 160d, and as such the delegation management unit 135ns may delegate access to those resources 160c, 160d to the lower-level delegation page 140ns.

Similarly, the non-secure operating system may have one or more non-secure programs running on it, such as non-secure applications, which also require access to particular resources for executing using the NPU. The non-secure applications have a lower program privilege level than the program privilege level of the non-secure operating system, and as such will be allocated to a non-secure delegation page 150ns having an even lower page privilege level. In such a case the delegation management unit 145ns of the non-secure delegation page 140ns may delegate access to one or more resources 160c, 160d which it has access to. For example, as indicated by the solid arrow D3 the delegation management unit 145ns of the non-secure delegation page 140ns may allow delegation of the resource 160d to a non-secure delegation page having a lower page privilege level. The application assigned to that non-secure delegation page can then access that resource directly when executing on the NPU.

In some examples, as described above in relation to accessing resources in a secure manner, it may be desirable to revoke access to one or more resources from a lower-level delegation page. One example may occur when a higher page privilege level non-secure delegation page originally delegates access to a resource, such as 160d, as indicated by arrows D1, D2, and D3, which may be used for scheduling transaction. This may not cause an issue if there is only a single program requesting access to the NPU at that page privilege level. However, where there are multiple programs having the same program privilege level, and as such allocated to the same non-secure delegation page, then delegating access to that particular resource may not be desirable, as it may result in issues if multiple programs are able to request access to the resource 160d at the same time. For example, if there are two programs running on the same operating system, then it may be desirable for the operating system to have control over the resource 160d and schedule transactions. In such an example, where the ability to schedule transactions is represented by resource 160d of FIG. 3, the delegation management unit 145ns of the non-secure delegation page 140ns which has the operating system assigned to it may revoke the delegation of the resource 160d, such that the operating system can schedule tasks on the NPU for each of the applications running on it, thereby limiting the likelihood of conflicts and errors arising.

In yet a further example, access to resources 160a-160e may be revoked from any higher-level delegation page, resulting in a cascade of revocations, to ensure that all lower-level delegation pages have access to the resource revoked. For example, the delegation management unit 135ns may revoke access to resource 160e. Such an action will result in the revocation of access to 160e by the delegation management unit 145ns of non-secure delegation page 140ns, and the revocation of access to 160e by the delegation management unit 135ns of non-secure delegation page 130ns.

Figure 4:
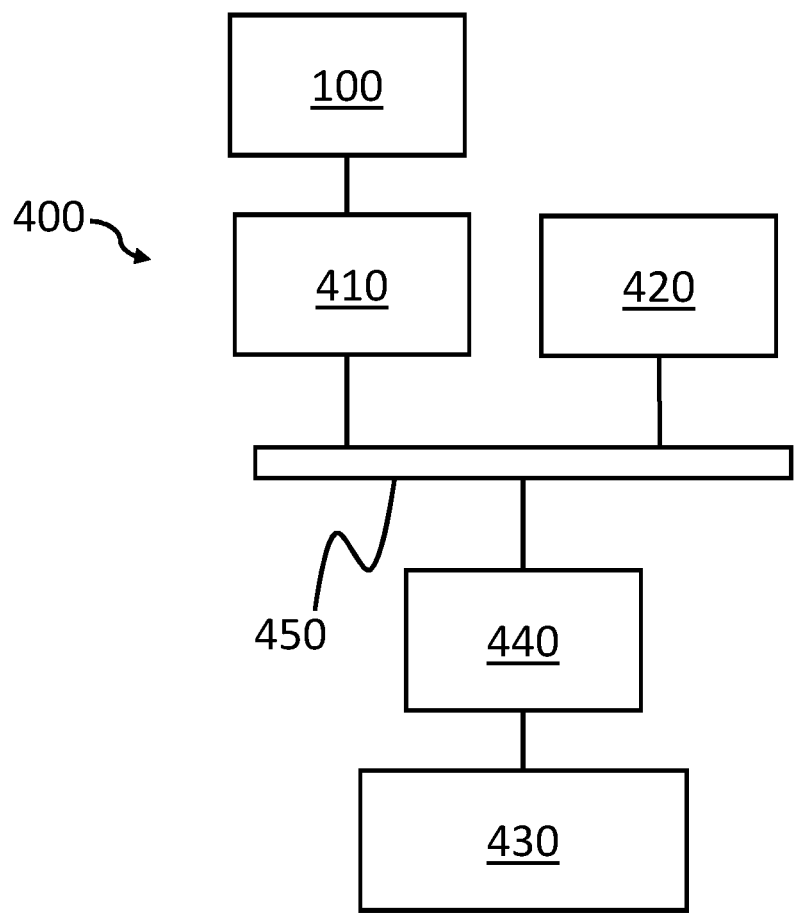
FIG. 4 shows schematically a system comprising the neural processing unit of FIG. 1.

FIG. 4 shows schematically a system 400 comprising an NPU, such as the NPU 100 described above in relation to FIG. 1. The system 400 may comprise one or more other processors 420 such as a central processing unit, a graphics processing unit, or an image processing unit, which may be combined as a System on Chip (SoC) or onto multiple SoCs to form one or more application processors. The one or more other processors 420 may be used to undertake some pre-processing of data prior to processing by the NPU 100, such as the analyzing of and determination of a security access method and delegation page for each transaction.

The system 400 also comprise a system memory management unit ('SMMU') 410 which receives transactions with a virtual address from the NPU 100. The SMMU translates that address to a physical address associated with a location in memory 430, and sends the transaction to the memory controller 440.

The system 400 also comprises memory 430 for storing data such as data for one or more of the programs described above, or other data such as data associated with a neural network to be processed by the NPU 100. The memory 430 is accessed via a memory controller 440 which is connected to a system bus 450. The memory 430 may also be arranged to store other information for use by the system 400.

The memory controller 440 may comprise a dynamic memory controller (DMC). The memory controller 440 is coupled to the memory 430 and is configured to manage the flow of data going to and from the memory 430. The memory 430 may have a greater storage capacity than the memory cache(s) of the NPU 100 or other processors 420. In some examples, the memory 430 is located in the NPU 100. For example, the memory 430 may comprise 'on-chip' memory. The memory 430 may, for example, comprise a magnetic or optical disk and disk drive or a solid-state drive (SSD). In some examples, memory 430 comprises a synchronous dynamic random-access memory (SDRAM). For example, the memory 430 may comprise a double data rate synchronous dynamic random-access memory (DDR-SDRAM).

In some examples of the system 400, the NPU 100 receives data from the processor 420 for use by the neural network. In other examples, the NPU 100 may form part of the processor 420, such that the processor 420 is capable of undertaking other tasks and executing a neural network. Where the processor 420 is capable of undertaking other tasks and executing the neural network, it may be formed as a combination of the modules/units described above along with the modules/units of the other processor, into a single SoC, or on multiple SoCs to form one or more application processors.

The NPU may be the NPU 100 described above in relation to FIG. 1 and maybe a neural network accelerator and include an interface via which inputs to a neural network may be received. The NPU 100 may be configured to obtain input data from the memory 430. The NPU 100 is a processor dedicated to implementing the classification of data using a neural network trained on a training set of data. For example, the NPU of the invention may be used for classifying objects and may have been trained on a data set comprising a plurality of examples of different objects.

The components of the system 400 may be interconnected using a system bus 450. This allows data to be transferred between the various components. The system bus 450 may be or include any suitable interface or bus. For example, an ARM® Advanced Microcontroller Bus Architecture (AMBA®) interface, such as the Advanced eXtensible Interface (AXI), may be used.

Figure 5:
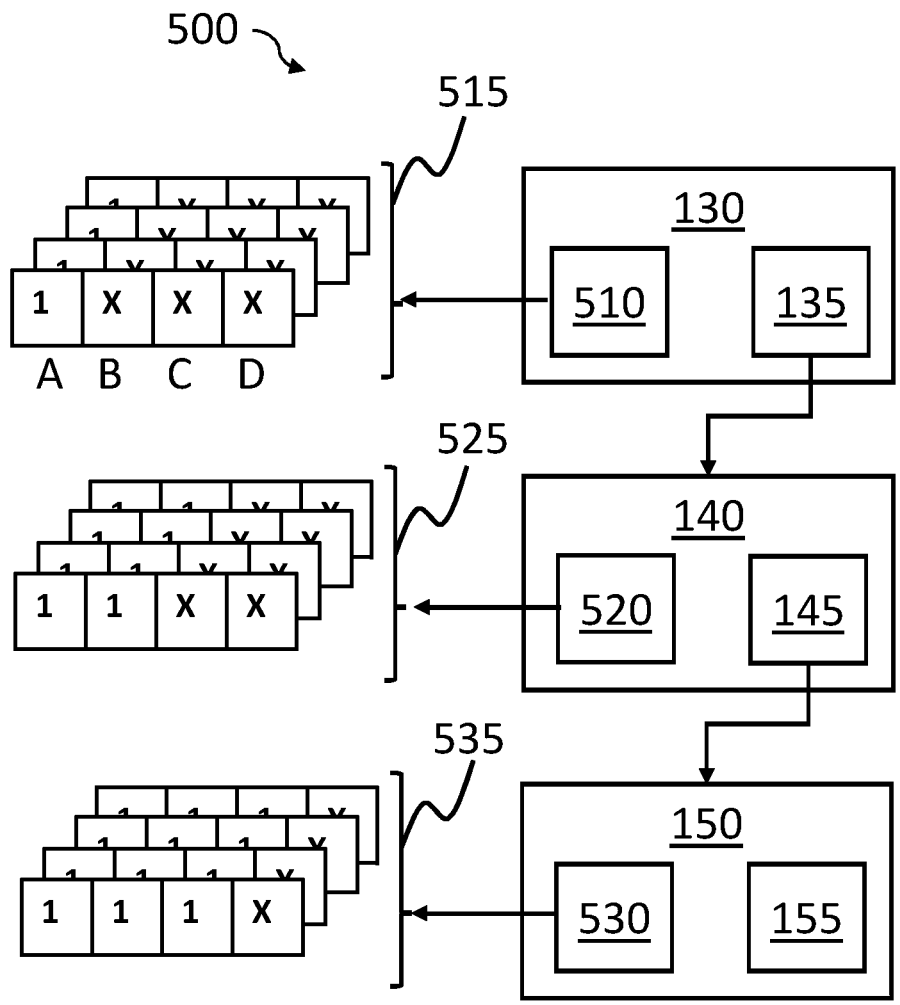
FIG. 5 shows schematically the generation of identifiers according to examples.

FIG. 5 shows schematically the generation of identifiers 500 for identifying the NPU 100 and one or more resources of the NPU 100 to a SMMU, such as the SMMU 410 described above in relation to FIG. 4.

Devices are often allocated a fixed identifier or range of identifiers, and would require the SMMU 410 to be reprogrammed every time the device was used for a different program, this can result in delay and adversely impact performance. Enabling the NPU 100 to change identifiers when requesting information from memory 430 via the SMMU 410 and memory controller 430 for different programs, ensures appropriate protections are in place to avoid contamination of different memory regions from the different programs. This allows the SMMU 410 to be programmed to recognize multiple different identifiers from the NPU and map them to the different address spaces of different programs in advance. The device is then able to change its identifiers so that the SMMU 410 sees a different identifier for different programs, which is faster and more efficient than reprogramming the SMMU 410.

When there is only a single device and/or program accessing the memory 430 the program can access memory using a single identifier. However, where there are multiple programs and/or devices accessing the memory 430 multiple identifiers are required so that regions of the memory 430 can be accessed by different programs and those programs can be identified independently to the SMMU 410, such that the SMMU 410 is able to put appropriate protections in place to ensure consistency and reduce overlap and the associated errors.

For example, a program is capable of creating multiple virtual address spaces in the memory 430 for use by the program during execution, the provision of multiple identifiers prevents contamination of different memory regions from the different programs, and as such resulting in data corruption and/or conflict when writing or reading data to/from memory 430. Along with delegating access to particular resources 160a-160e as described in relation to FIGS. 1-3 above, the delegation pages 130-150, in some examples may be responsible for generating identifiers for accessing memory 430 via a SMMU 410.

Each of the delegation pages 130-150 may comprise an identifier generation unit 510, 520, 530 each capable of delegating access to one or more identifiers 515, 525, 535 for use by the SMMU to translate a virtual address into a physical address. The identifiers 515, 525, 535 may be based on the page and/or program priority level of a program assigned to the delegation pages 130, 140, 150 and the resources each delegation page 130, 140, 150 has access to.

Each identifier may comprise a plurality of configurable portions A-D, the number of configurable portions may be associated with the number of delegation pages of the NPU. Whilst the portions of the identifiers 515, 525, 535 in FIG. 5 are represented as a single bit, it will be appreciated that the portions may be represented by any number of bits as required to identify each of the programs and/or resources.

As mentioned above, devices often have a set range of identifiers used by the SMMU to indicate the origin of a task, for example, the SMMU may be arranged to recognize that tasks originating from the NPU have an identifier in the range 1000-1FFF, it will be appreciated that other bases may be used to represent the identifier. As such, tasks, such as those originating from a hypervisor, allocated to the first delegation page 130 and have access to a first set of resources, may enable those resources to access memory with an address of the whole range, i.e. 1000-1FFF, as represented by the identifiers 515 generated by the identifier generation unit 510 of the first delegation page.

If there were multiple tasks at the same privilege level, then each of those tasks may have a different memory space, and as such, may access memory within a subset of the range. As mentioned above, in relation to FIGS. 1-3 tasks may be executed under another task on a higher delegation page. Therefore, when resources are delegated to lower delegation pages, such as pages 140 and 150, the identifier generation unit 510 fixes the most significant portion, and enables the identifier generation unit 520, 530 of the lower delegation pages 140, 150 to amend any of the lower significant portions.

As shown in FIG. 5, the first delegation page is able to amend portions B-C whilst portion A is fixed, this is representative of the fact that the NPU has an identifier in the range 1000-1FFF. A transaction allocated to the first delegation page 130 will originate from a high privilege level program and therefore may have one or more lower privilege programs running under it, and as such, resources may be delegated to the second delegation page 140. The transaction allocated to the second delegation page 140 may have identifiers generated by the identifier generation unit 520 where portions C and D are customisable. However, portions A and B have been fixed. Portion A is fixed as this indicates the range of the addresses of the NPU, and portion B is fixed as that indicates the task running on the first delegation page 130.

Where there are multiple tasks allocated to a delegation page 130, 140, 150 then the least significant portion may differ between them to identify the task and the originating program. For example, if there were two operating systems running on the second delegation page 140, the identifier generation unit 510 may have allocated identifiers 11XX to the first operating system and 12XX to the second operating system. As such, any tasks from programs which are running under the operating systems and which are allocated to the second delegation page 140, can be identified using a unique range of identifiers.

Similarly, any tasks running on programs allocated to the third delegation page 150 may have identifiers generated by the identifier generation unit 530 which have portion C fixed, thereby enabling tasks to have unique identifiers representing resources which they require access to.

Figure 6:
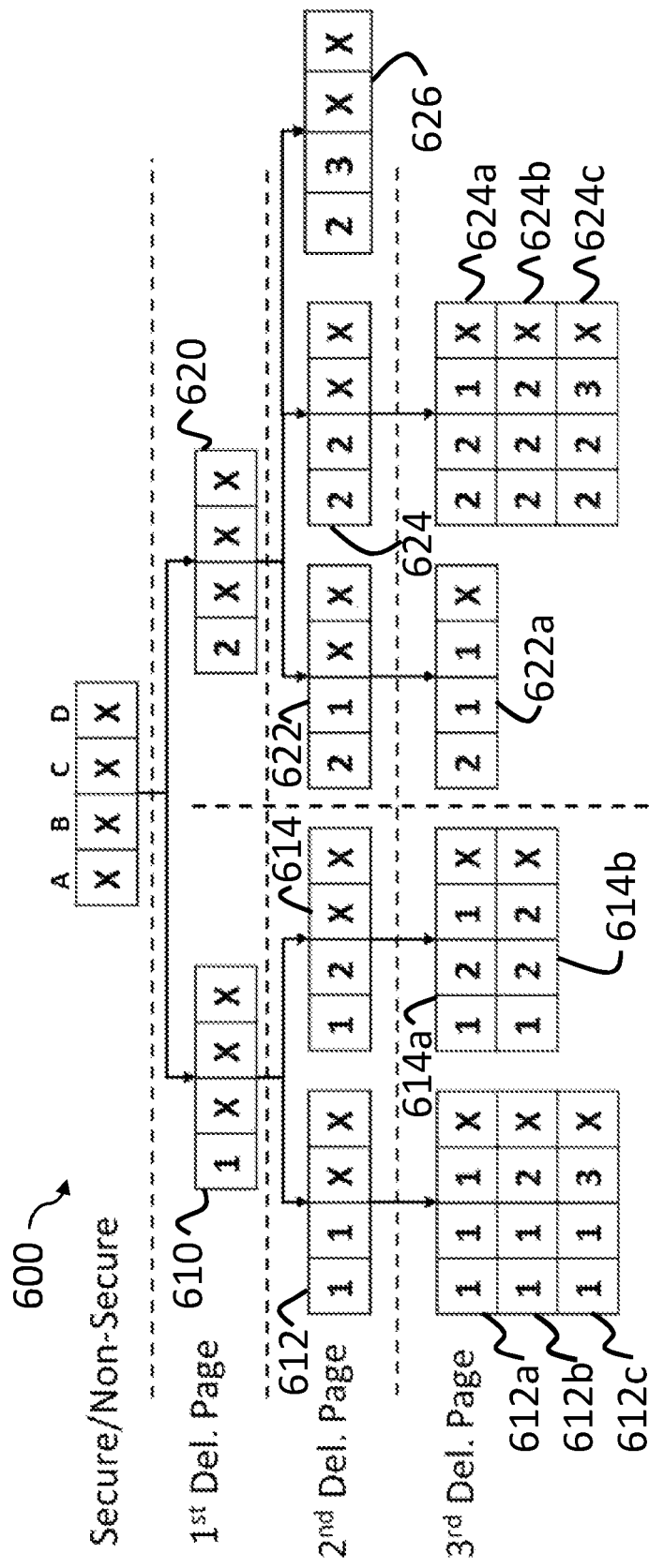
FIG. 6 shows an exemplary address structure generated by identifier generation units.

FIG. 6 shows an exemplary identifier structure 600 generated by the identifier generation units 510, 520, 530 of the delegation pages 130, 140, 150. At the secure/non-secure delegation page, as described above in relation to FIGS. 2 and 3, there may be separate address spaces allocated to resources accessed by tasks in a secure and non-secure manner. As with the example 500 of FIG. 5, the SMMU 410 may recognize identifiers in a particular range as originating from the NPU, for example the range 1000-2FFF. As such, identifiers may be split to represent resources based on their access method from the tasks by fixing the most significant portion, portion A. In the exemplary identifier structure, there are two programs running on the first delegation page, one may be arranged to access resources in a secure manner and the other may be arranged to access resources in a non-secure manner, as such each program has a range of identifiers 610 which is represented by identifiers 1XXX, and 620 which is represented by identifiers 2XXX. As such, portion A fixed with a different value. The values of portion A are fixed such that the identifiers 610, 620 still fall within the range of identifiers indicative of the NPU.

Each of the programs have multiple tasks running under them which are allocated to the second delegation page. The first program running on the first delegation page has two programs running under it. As such, each of these programs may have a unique range of identifiers whereby portion B is fixed such that the identifiers exist within the range of identifier 610, as indicated by identifiers 612, which is represented by identifiers 11XX and 614 which is represented by identifiers 12XX. Similarly, the second program running on the second delegation page has three programs each having their own identifiers 622 represented by identifiers 21XX, 624 represented by identifiers 22XX, and 626 represented by identifiers 23XX.

As with programs allocated to the first delegation page, each of the programs allocated to the second delegation page, may have other programs allocated to the third delegation page running under them, each with their own identifiers where portion C is fixed, as indicated by identifiers 612a-612c, 614a, 614b, 622a, 624a-624c.

Figure 7:
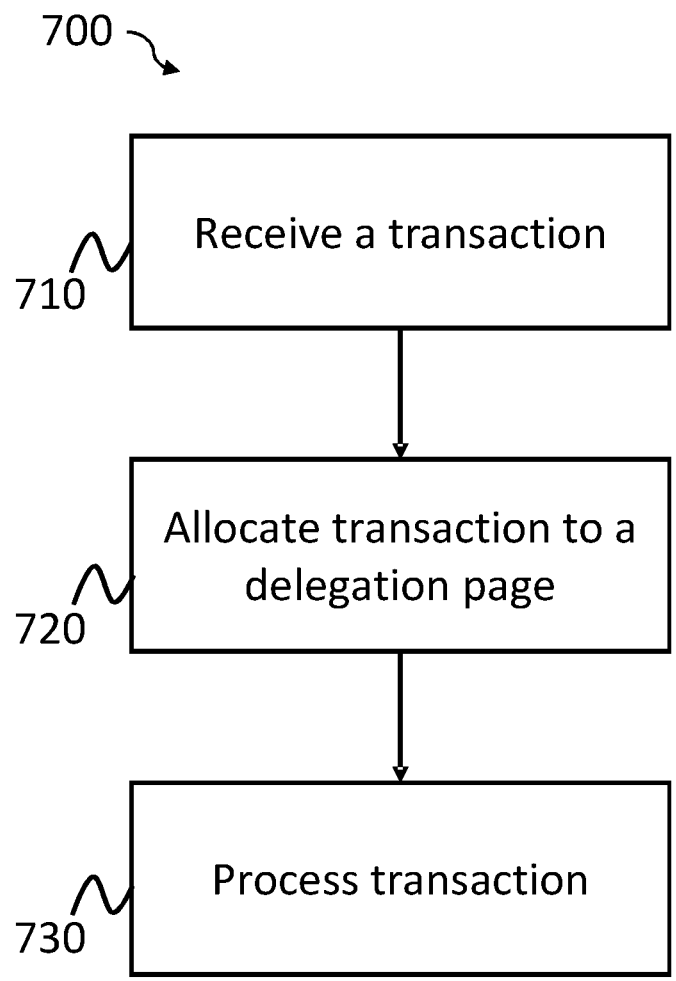
FIG. 7 is a flowchart showing a method according to examples.

FIG. 7 is a flowchart showing a method 700 according to examples. At item 710, a transaction is received from a program. The transaction may be an instruction to initiate a particular task, such as identifying objects, or other tasks for processing by an NPU. The program has an associated program privilege level corresponding to its type, for example, a hypervisor having a high program privilege level, an operating system having a medium program privilege level, and an application having a low program privilege level. It will be appreciated that other methods of allocating program privilege levels to programs may be used. The program privilege levels assigned to the programs are indicative of a relationship between the programs, for example, an application may have a program privilege level lower than that of the operating system it is running on, similarly, the operating system may have a program privilege level of the hypervisor it is running on.

Next, at block 720, the transaction is assigned to a delegation page. Each transaction has an associated program privilege level based on its originating program and which, in some examples may be determined by a processor, such as a CPU, GPU, or ISP for example. The transaction is allocated to the delegation page where the page privilege level and program privilege level are substantially equal, or in many cases equal. Each delegation page has a delegation management unit which delegates access to one or more registers to a delegation page with a lower page privilege level, thereby allowing transactions allocated to the lower page privilege level to have access to those resources. In some examples, the delegation page may also comprise an identifier generation unit for use when accessing memory via a SMMU, as described above in relation to FIG. 5.

Once the transaction has been allocated to the delegation page, the method proceeds to item 730 where the transaction is processed. Processing the transaction may involve executing the transaction in the neural network, such as performing an identification or training task associated with a neural network; configuring one or more identifiers; or configuring and communicating with firmware. The transaction may use the resources delegated to the page it is assigned to, to do this. Processing the transaction may also comprise determining one or more identifiers as described above in relation to FIG. 5.

The above embodiments are to be understood as illustrative examples of the invention. Further embodiments of the invention are envisaged. It is to be understood that any feature described in relation to any one embodiment may be used alone, or in combination with other features described, and may also be used in combination with any other of the embodiments. Furthermore, equivalents and modifications not described above may also be employed with out departing from the scope of the invention, which is defined in the accompanying claims.

What is claimed is:

1. A neural processing unit including at least one processor, the neural processing unit comprising:
   an input module executed by the at least one processor to receive a transaction from at least one program, each program having an associated program privilege level, and being executed by a second processor separate from the at least one processor of the neural processing unit;
   a plurality of delegation pages, each delegation page comprising a delegation management unit and being associated with a page privilege level;
   at least one resource is accessed by at least one of the delegation pages; and
   a processing module executed by the at least one processor to process the transaction, wherein processing the transactions comprises allocating the transaction to a delegation page based on the program privilege level and the page privilege level of the delegation page, and wherein the transaction is configured to access the at least one resource accessible by the delegation page;
   wherein the at least one program is executed by the at least one processor to instruct the delegation management unit of a first delegation page, having a first-page privilege level, to delegate to the at least one resource, to a second delegation page, having a second-page privilege level, and wherein the first-page privilege level is higher than the second-page privilege level; and wherein the delegation management unit of the first delegation page is executed by the at least one processor to delegate access to the at least one resource, to the second delegation page, if the at least one resource was delegated to the first delegation page by a third delegation page having a third page privilege level, wherein the third page privilege level is higher than the first page privilege level.

2. The neural processing unit of claim 1, further comprising a security module having access to the at least one resource, and comprising a security delegation management unit, the security delegation management unit executed by the at least one processor to delegate access to at least one of the delegation pages, wherein the at least one delegation page is executed by the at least one processor to access the at least one resource in a secure manner or a non-secure manner.

3. The neural processing unit of claim 2, wherein the delegation management unit of the first delegation page and the delegation management unit of the second delegation page delegate access to the at least one resource in the same secure or non-secure manner.

4. The neural processing unit of claim 1, wherein the delegation management unit of the first delegation is further executed by the at least one processor to revoke access to the at least one resource, previously delegated to the second delegation page.

5. The neural processing unit of claim 1, wherein each of the plurality of delegation pages comprises an identifier generation unit for generating an identifier associated with the at least one program of the transaction assigned to the delegation page.

6. The neural processing unit of claim 5 wherein the identifier identifies one or more data streams associated with the at least one program to a memory management unit.

7. The neural processing unit of claim 5, wherein the identifier is associated with the delegation page of the transaction.

8. The neural processing unit of claim 1, wherein the at least one program is any of: a hypervisor; an operating system; and an application arranged to run on the operating system.

9. A method of processing transactions by a neural processing unit, the method comprising the steps of:
receiving a transaction from at least one program, each program having an associated program privilege level, and being executed by a processor separate from the neural processing unit;
allocating the transaction to one of a plurality of delegation pages, each delegation page having a page privilege level and comprising a delegation management unit, wherein allocating the transaction is based on the page privilege level of the delegation page and the program privilege level; and
processing the transaction at the delegation page, wherein processing the transaction comprises accessing at least one of a plurality of resources by the transaction, the at least one of a plurality of resources being accessible to the delegation page;
wherein the at least one program is executed by the processor to instruct the delegation management unit of a first delegation page, having a first-page privilege level, to delegate access to at least one resource to a second delegation page, having a second-page privilege level, and wherein the first-page privilege level is higher than the second-page privilege level; and
wherein the delegation management unit of the first delegation page is executed by the at least one processor to delegate access to the at least one resource, to the second delegation page, if the at least one resource was delegated to the first delegation page by a third delegation page having a third page privilege level, wherein the third page privilege level is higher than the first page privilege level.

10. The method of claim 9, further comprising determining whether the transaction is to access the at least one of the plurality of resources in a secure or non-secure manner.

11. The method of claim 9, wherein the delegation management unit of the first delegation page and the delegation management unit of the second delegation page delegate access to the at least one resource in the same secure or non-secure manner.

12. The method of claim 9, further comprising the step of revoking access to at least one resource previously delegated by the first delegation page to the second delegation page.

13. The method of claim 9, further comprising the step of generating an identifier associated with the at least one program of the transaction assigned to the delegation page.

14. The method of claim 13, wherein the identifier identifies at least one of the resources to a memory management unit.

15. The method of claim 13, wherein the identifier is associated with the delegation page of the transaction.

16. The method of claim 9, wherein the program is any of:
a hypervisor; an operating system; and an application arranged to run on the operating system.

17. A non-transitory computer readable storage medium comprising a set of computer-readable instructions stored thereon which, when executed by at least one processor, cause the at least one processor to:
receive a transaction from at least one program, each program having an associated program privilege level, and being executed by a second processor separate from the at least one processor;
allocate the transaction to one of a plurality of delegation pages, each delegation page having a page privilege level and comprising a delegation management unit, wherein allocating the transaction is based on the page privilege level of the delegation page and the program privilege level; and
process the transaction at the delegation page, wherein processing the transaction comprises accessing at least one of a plurality of resources by the transaction, the at least one of a plurality of resources being accessible to the delegation page;
wherein the at least one program is executed by the at least one processor to instruct the delegation management unit of a first delegation page, having a first-page privilege level to delegate access to at least one resource to a second delegation page having a second-page privilege level, and wherein the first-page privilege level is higher than the second-page privilege level; and
wherein the delegation management unit of the first delegation page is executed by the at least one processor to delegate access to the at least one resource, to the second delegation page, if the at least one resource was delegated to the first delegation page by a third delegation page having a third page privilege level, wherein the third page privilege level is higher than the first page privilege level.

\* \* \* \* \*